(12) United States Patent
Moss

(10) Patent No.: US 11,948,053 B2
(45) Date of Patent: Apr. 2, 2024

(54) INFERENCER GRAPH FOR IMPLEMENTING MACHINE LEARNING MODEL TOPOLOGY

(71) Applicant: Megh Computing, Inc., Hillsboro, OR (US)

(72) Inventor: Duncan Moss, Hillsboro, OR (US)

(73) Assignee: MEGH COMPUTING, INC., Hillsboro, OR (US)

( * ) Notice: Subject to any disclaimer, the term of this patent is extended or adjusted under 35 U.S.C. 154(b) by 867 days.

(21) Appl. No.: 17/025,871

(22) Filed: Sep. 18, 2020

(65) Prior Publication Data

US 2022/0092465 A1 Mar. 24, 2022

(51) Int. Cl.
*G06N 20/00* (2019.01)
*G06Q 10/0631* (2023.01)

(52) U.S. Cl.
CPC ....... *G06N 20/00* (2019.01); *G06Q 10/06315* (2013.01)

(58) Field of Classification Search
CPC .......................... G06N 20/00; G06Q 10/06315
See application file for complete search history.

(56) References Cited

U.S. PATENT DOCUMENTS

| | | | |
|---|---|---|---|
| 9,363,282 B1 * | 6/2016 | Yu | H04L 63/0218 |
| 10,789,402 B1 * | 9/2020 | Vemuri | G06N 3/063 |
| 11,057,278 B1 * | 7/2021 | Côté | H04L 41/16 |
| 11,661,072 B1 * | 5/2023 | Cardona | G06N 20/00 |
| | | | 701/29.3 |

(Continued)

FOREIGN PATENT DOCUMENTS

| | | | | |
|---|---|---|---|---|
| CN | 103383819 A | * | 11/2013 | |
| EP | 3518176 A1 | * | 7/2019 | G06F 16/9024 |

OTHER PUBLICATIONS

Umuroglu, Y. et al., "FINN: A Framework for Fast, Scalable Binarized Neural Network Inference," arXiv/Cornell University, The 25th International Symposium on Field-Programmable Gate Arrays in Feb. 2017, 10 pages.

(Continued)

*Primary Examiner* — David E Choi
(74) *Attorney, Agent, or Firm* — Alleman Hall & Tuttle LLP

(57) ABSTRACT

A computing system, including a processor configured to, at development time, receive a machine learning model topology including a plurality of layers. The processor may be further configured to generate an internal representation graph of the machine learning model topology. The internal representation graph may include a plurality of internal representation layers. By performing one or more modifications to the internal representation graph, the processor may be further configured to generate an inferencer graph including a plurality of inferencer layer blocks. Each inferencer layer block may indicate an input buffer size, a logic function, and an output buffer size. At deployment time, the processor may be further configured to transmit, to a plurality of processing devices, instructions to implement the machine learning model topology with the respective input buffer sizes, logic functions, and output buffer sizes selected for the plurality of inferencer layer blocks of the inferencer graph.

20 Claims, 10 Drawing Sheets

(56) References Cited

U.S. PATENT DOCUMENTS

| | | | |
|---|---|---|---|
| 2007/0245275 A1* | 10/2007 | Jandhyala | G06F 30/398 |
| | | | 716/139 |
| 2011/0209111 A1* | 8/2011 | Siddiqui | G06F 30/396 |
| | | | 716/119 |
| 2017/0359754 A1* | 12/2017 | Yousefi'zadeh | G06N 3/084 |
| 2018/0114437 A1* | 4/2018 | Singh | H05B 47/125 |
| 2018/0203443 A1* | 7/2018 | Newman | B60L 1/00 |
| 2018/0302275 A1* | 10/2018 | Fawcett | H04L 41/0803 |
| 2020/0012924 A1* | 1/2020 | Ma | G06V 10/764 |
| 2021/0119848 A1* | 4/2021 | Ibars Casas | H04L 1/0052 |
| 2021/0224185 A1* | 7/2021 | Zhou | G06F 9/5011 |
| 2022/0075793 A1* | 3/2022 | Jezewski | G06N 5/04 |
| 2022/0092465 A1* | 3/2022 | Moss | G06N 3/04 |
| 2023/0370491 A1* | 11/2023 | Crabtree | H04L 63/20 |
| 2023/0376748 A1* | 11/2023 | Tian | G06N 3/08 |

OTHER PUBLICATIONS

Hall, M. et al., "HPIPE: Heterogeneous Layer-Pipelined and Sparse-Aware CNN Inference for FPGAs," arXiv/Cornell University, Proceedings of the 2020 ACM/SIGDA International Symposium on Field-Programmable Gate Arrays, Feb. 2020, 10 pages.

Fowers, J. et al., "A Configurable Cloud-Scale DNN Processor for Real-Time AI," 2018 ACM/IEEE 45th Annual International Symposium on Computer Architecture (ISCA), Jun. 1, 2018, 14 pages.

Tridgell, S. et al., "Unrolling Ternary Neural Networks," ACM Transactions on Reconfigurable Technology and Systems, Oct. 2019, 24 pages.

\* cited by examiner

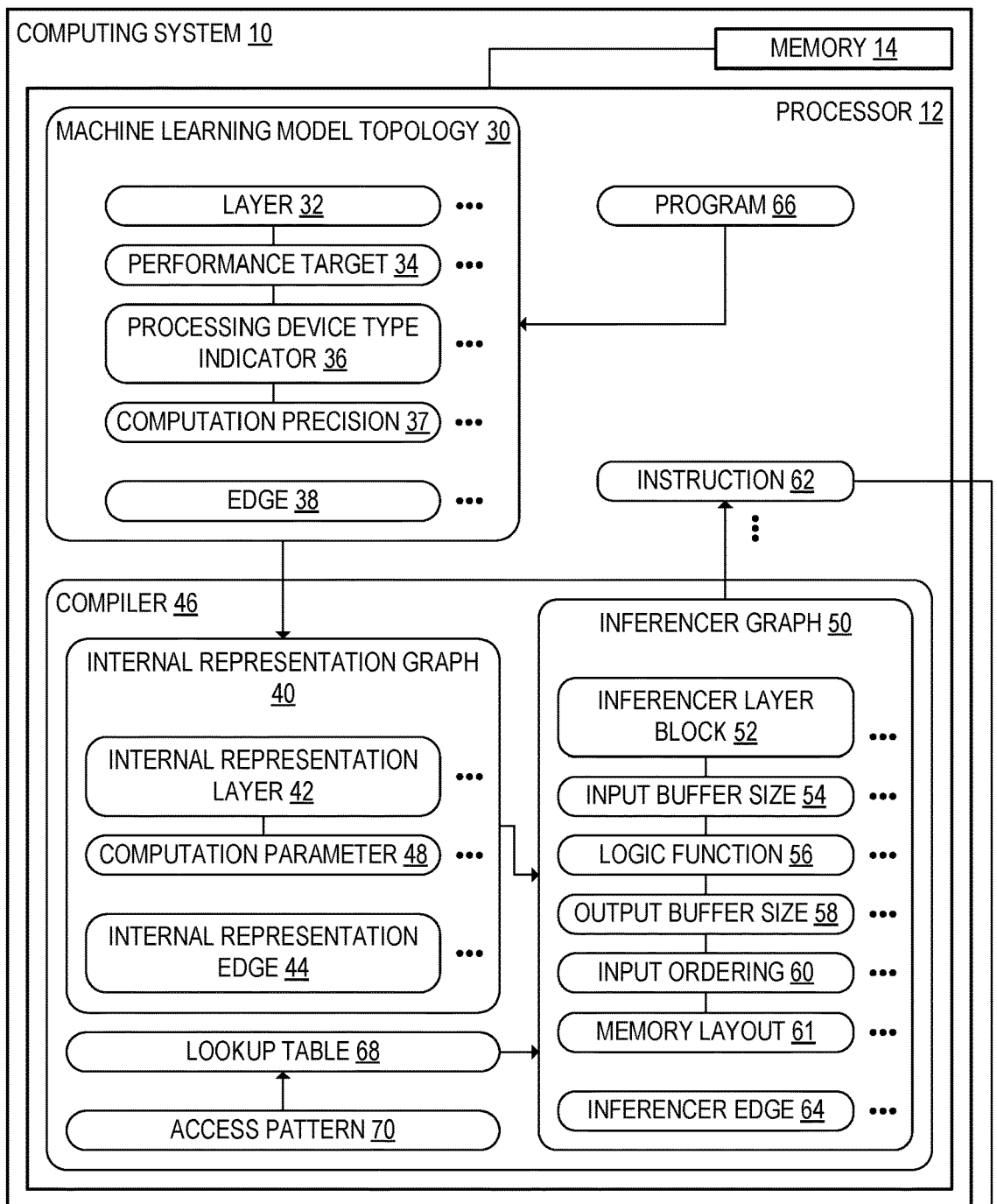
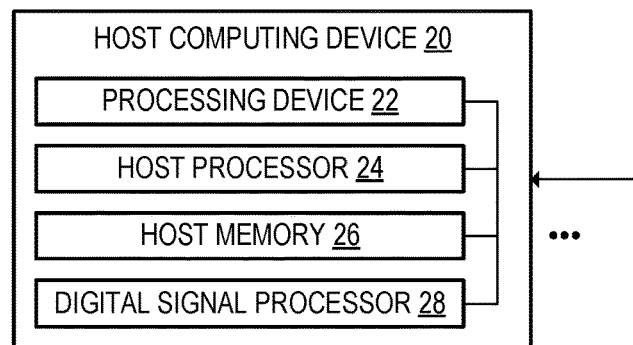
FIG. 1

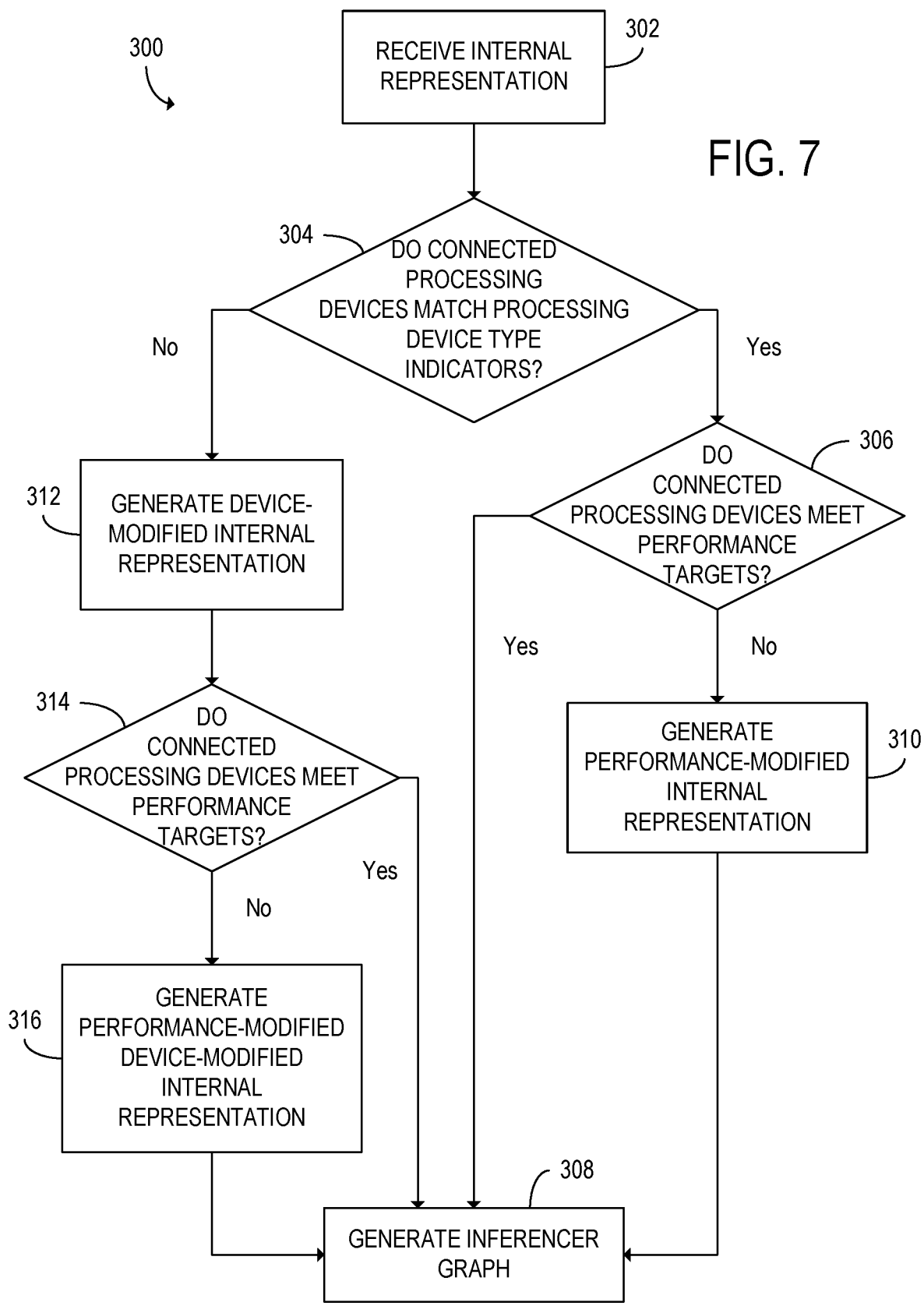

418 — FOR A FIRST INTERNAL REPRESENTATION LAYER AND A SECOND INTERNAL REPRESENTATION LAYER OF THE INTERNAL REPRESENTATION GRAPH THAT BOTH OUTPUT TO A THIRD INTERNAL REPRESENTATION LAYER, SETTING THE OUTPUT BUFFER SIZES OF THE CORRESPONDING INFERENCER LAYER BLOCKS TO BE EQUAL TO EACH OTHER

420 — APPLYING BIAS CHANNEL REDUCTION, 3 × 3 WINOGRAD CONVOLUTION, 5 × 5 COMPLEX-DOMAIN WINOGRAD CONVOLUTION, OR FILTER-SPARSITY PACKING AND RUNTIME SKIPPING TO AT LEAST ONE INTERNAL REPRESENTATION LAYER OF THE PLURALITY OF INTERNAL REPRESENTATION LAYERS

422 — SELECTING AN INPUT ORDERING FOR A PLURALITY OF INFERENCER LAYER INPUTS TO AT LEAST ONE INFERENCER LAYER BLOCK OF THE PLURALITY OF INFERENCER LAYER BLOCKS

424 — DETERMINING A RESPECTIVE MEMORY LAYOUT OF MEMORY ALLOCATED TO EACH INFERENCER LAYER BLOCK OF THE PLURALITY OF INFERENCER LAYER BLOCKS

426 — ALLOCATING AT LEAST ONE DSP TO PERFORM THE LOGIC FUNCTION OF AT LEAST ONE INFERENCER LAYER BLOCK OF THE PLURALITY OF INFERENCER LAYER BLOCKS

FIG. 8D ns
INFERENCER GRAPH FOR IMPLEMENTING MACHINE LEARNING MODEL TOPOLOGY

BACKGROUND

Hardware accelerator devices are increasingly used when performing inference of machine learning models. These hardware accelerator devices are specialized processing devices that are built to be highly efficient for specific computing operations. In addition, the topologies according to which the inputs, outputs, and layers of machine learning models are structured have become more varied as new machine learning techniques have been developed.

SUMMARY

According to one aspect of the present disclosure, a computing system is provided, including a processor configured to, at development time, receive a machine learning model topology including a plurality of layers. The processor may be further configured to generate an internal representation graph of the machine learning model topology. The internal representation graph may include a plurality of internal representation layers. By performing one or more modifications to the internal representation graph, the processor may be further configured to generate an inferencer graph including a plurality of inferencer layer blocks. Each inferencer layer block may indicate an input buffer size, a logic function, and an output buffer size. At deployment time, the processor may be further configured to transmit, to a plurality of processing devices, instructions to implement the machine learning model topology with the respective input buffer sizes, logic functions, and output buffer sizes selected for the plurality of inferencer layer blocks of the inferencer graph.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 1 schematically shows a computing system connected to a host computing device, according to one example embodiment.

FIG. 7 shows an example flowchart of a method that may be performed at the processor when generating an inferencer graph from an internal representation graph, according to the embodiment of FIG. 1.

FIGS. 8B-8E show additional steps of the method of FIG. 8A that may be performed in some examples.

DETAILED DESCRIPTION

Figure 2:
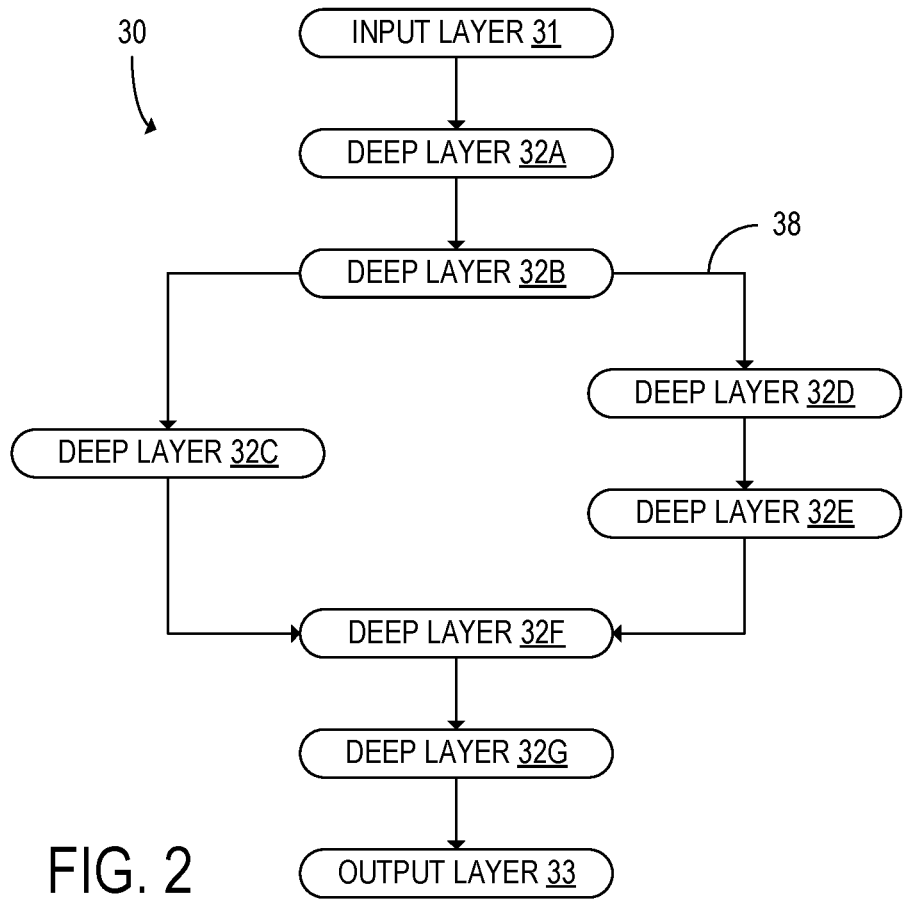
FIG. 2 shows an example machine learning model topology, according to the embodiment of FIG. 1.

Conventional methods of routing data through hardware accelerators when performing inference of machine learning models use model accelerators that are designed to support predefined sets of common machine learning model topologies such as AlexNet, VGGNet and ResNet. A model accelerator typically has a corresponding software compiler that receives a user-defined topology and transforms the topology into a set of instructions that are executable on the model accelerator. The model accelerator then processes these instructions in order. First, the model accelerator decodes each instruction and loads data indicated by the instruction into caches in on-chip or off-chip memory. The stored data is then read into the hardware accelerator device from the caches. The outputs of the hardware accelerator are stored in the on-chip or off-chip memory and the next instruction is processed.

Existing hardware acceleration methods that use a model accelerator, as discussed above, may be incompatible with machine learning model topologies that are not included in the model accelerator's set of supported topologies. In addition, when the model accelerator is capable of processing an uncommon topology, data caching may act as a bottleneck. Thus, delays may occur in computing or executing the machine learning model, and processing devices may be under-utilized during memory caching. Existing hardware acceleration methods that use model accelerators also lack support for mixed-precision computation, in which different layers of the machine learning model topology use different data precisions.

In order to address the above shortcomings, a computing system 10 is provided, as schematically shown in the example of FIG. 1. As shown in FIG. 1, the computing system 10 may include a processor 12 and memory 14. The functionality of the processor 12 and memory 14 of the computing system 10 may, in some examples, be distributed between a plurality of communicatively coupled physical computing devices. For example, the computing system 10 may include a plurality of physical computing devices located in a data center and connected by a wired connection. In this example, the wired connection may be an Ethernet connection.

The computing system 10 may be configured to communicate with one or more host computing devices 20 in which one or more processing devices 22 are located. Each processing device 22 may be a hardware accelerator used for performing inference of machine learning models. For example, each processing device 22 may be a central processing unit (CPU), a graphical processing unit (GPU), an application-specific integrated circuit (ASIC), or a field-programmable gate array (FPGA). In addition to one or more processing devices 22, each host computing device may include a host processor 24 and host memory 26. In some examples, the one or more host computing devices 20 may be located in a data center and may be connected to the processor 12 of the computing system 10 by wired connections.

The processor 12 of the computing system 10 may be configured to receive a machine learning model topology 30. The machine learning model topology 30 may be received at development time, which may occur prior to a deployment time at which the machine learning model topology 30 is implemented on the processing devices 22. The processor 12 may, in some examples, be configured to receive the machine learning model topology 30 from a program 66 at which a user may define the properties of the machine learning model topology 30. The program 66 may, for example, be a software development kit (SDK).

The machine learning model topology 30 may include a plurality of layers 32. In addition, the machine learning model topology 30 may include a plurality of edges 38 connecting the layers 32. For example, the machine learning model topology 30 may be a directed acyclic graph (DAG), as shown in the example of FIG. 2. The machine learning model topology 30 depicted in FIG. 2 includes an input layer 31 and an output layer 53. Between the input layer 31 and the output layer 33, the machine learning model topology 30 of FIG. 2 further includes a plurality of deep layers 32A, 32B, 32C, 32D, 32E, 32F, and 32G. In addition, the machine learning model topology 30 includes a plurality of directed edges 38 connecting the layers. The machine learning model topology 30 includes two branches that diverge from the deep layer 32B and rejoin at the deep layer 32F, one of which includes the deep layer 32C and the other of which includes the deep layers 32D and 32E.

In some examples, the plurality of layers 32 included in the machine learning model topology 30 may have two or more respective computation precisions 37. The computation precision 37 of a layer 32 may, for example, be 4-bit integer, 8-bit integer, 16-bit integer, or 32-bit floating point. When the machine learning model topology 30 has different computation precisions 37 at different layers 32, the machine learning model topology 30 may be less computationally intensive to implement on the plurality of processing devices 22 compared to a machine learning model topology 30 that uses the same computation precision 37 for each layer 32.

At development time, when the processor 12 receives the machine learning model topology 30, the processor 12 may be further configured to receive a respective plurality of performance targets 34 for the plurality of layers 32 of the machine learning model topology 30. Each performance target 34 may, for example, be a maximum latency threshold for the computations that are configured to be performed at the layer 32. As another example, the performance target 34 for a layer 32 may be a minimum throughput threshold for the one or more processing devices 22 at which the computations indicated for the layer 32 are executed. The minimum throughput threshold in such examples may be a minimum number of inputs (e.g. images or video frames) per second. As another example, the performance target 34 may be a threshold number of inputs per second per watt of power used, or a number of inputs per second per total cost of ownership (TCO).

At development time, the processor 12 may be further configured to receive a plurality of processing device type indicators 36 for the plurality of layers 32 of the machine learning model topology 30. Each processing device type indicator 36 may indicate one or more types of processing device 22 on which the computations indicated for that layer 32 are configured to be performed. For example, the processing device type indicator 36 for a layer 32 may indicate that the layer 32 is configured to be computed at a GPU.

Returning to FIG. 1, the processor 12 may be further configured to generate an internal representation graph 40 of the machine learning model topology 30. The internal representation graph 40 may include a plurality of internal representation layers 42 and a plurality of internal representation edges 44. Similarly to the machine learning model topology 30, the internal representation graph 40 may be a DAG.

In some examples, as shown in FIG. 1, the internal representation graph 42 may be generated during development time at a compiler 46. The compiler 46 may be configured to perform a parse phase, an optimization phase, and a generation phase. During the parse phase, the processor 12 may be configured to generate an initial version of the internal representation graph 40. During the optimization phase, the processor 12 may be further configured to perform one or more modifications to the internal representation graph 40 generated at the parse phase.

Figure 3:
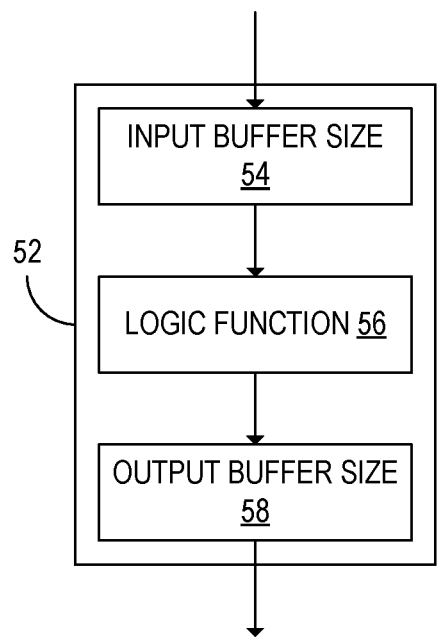
FIG. 3 shows an example inferencer layer block, according to the embodiment of FIG. 1.

During the generation phase, the processor 12 may be further configured to generate an inferencer graph 50 from the internal representation graph 40. The inferencer graph 50 may include a plurality of inferencer layer blocks 52 connected by a plurality of inferencer edges 64. In addition, each inferencer layer block 52 may indicate an input buffer size 54, a logic function 56, and an output buffer size 58 for data processed at that inferencer layer block 52. Each inferencer layer block 52 may correspond to a layer 32 of the machine learning model topology 30. FIG. 3 shows an example inferencer layer block 52. With reference to the example of FIG. 2, corresponding inferencer layer blocks 52 may be generated for the input layer 31, the output layer 33, and each of the deep layers 32A, 32B, 32C, 32D, 32E, 32F, and 32G.

Example modifications to the internal representation graph 40 that may be made by the compiler 46 at the optimization phase are now provided. In one example, the processor 12 may be configured to set one or more computation parameters 48 for each of the internal representation layers 42. The computation parameters 48 for an internal representation layer 42 may be the parameters of an inference function that is configured to be executed at one or more processing devices 22 of the plurality of processing devices 22 to compute the internal representation layer 42.

In some examples, the computation parameters 48 of the internal representation layer 42 may be modified based at least in part on the performance target 34 for the corresponding layer 32 of the machine learning model topology 30. In such examples, the processor 12 may be configured to compare the performance target 34 to an estimated performance for that set of computation parameters 48. In some examples, the estimated performance may be determined by determining, from the internal representation graph 40, a total number of multiplications and additions that are configured to be performed. The total number of multiplications and additions may, in this example, be divided by a rate at which a DSP 28 performs multiplications and additions in order to obtain an estimated duration of implementing the internal representation graph. In some examples, the processor 12 may be configured to determine whether an overall performance estimate for all the internal representation layers 42 of the internal representation graph 40 is below the performance target 34. When the overall performance estimate is below the performance target 34, the processor 12 may be further configured to throw an error. When the overall performance estimate is above the performance target 34, then for each internal representation layer 42, the processor 12 may instead be further configured to apply a sequential least-squares quadratic programming (SLSQP) algorithm to the one or more computation parameters 48 for that internal representation layer 42 to compute an updated set of computation parameters 48 with a higher estimated performance.

Figure 4:
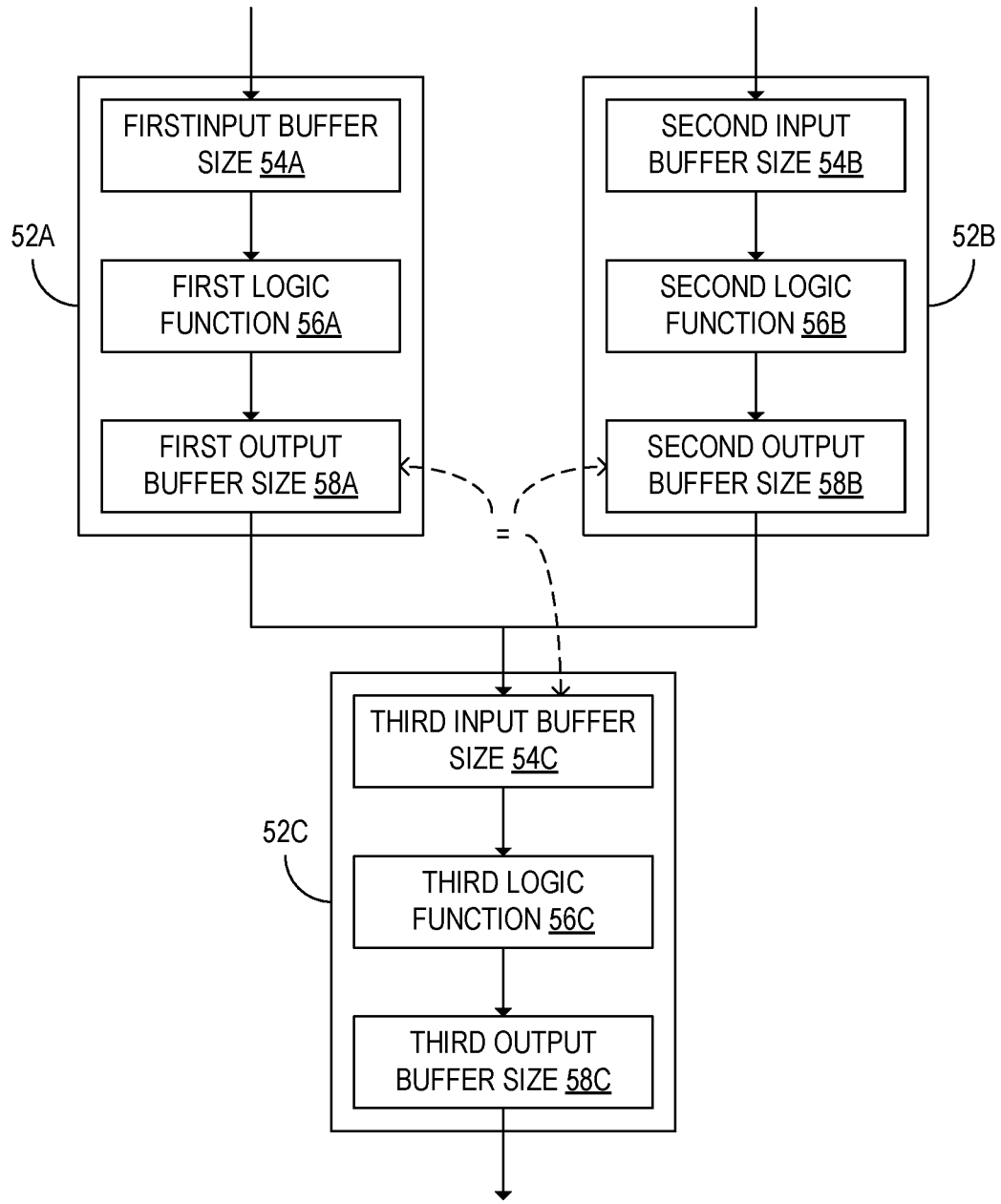
FIG. 4 shows a first inferencer layer block and a second inferencer layer block that both output to a third inferencer layer block, according to the embodiment of FIG. 1.

During the optimization phase, the processor 12 may be further configured to select the output buffer sizes 58 that are configured to be included in the inferencer layer blocks 52 when the inferencer layer blocks 52 are generated during the generation phase. FIG. 4 shows an example of a first inferencer layer block 52A and a second inferencer layer block 52B that both output to a third inferencer layer block 52C. The first inferencer layer block 52A, the second inferencer layer block 52B, and the third inferencer layer block 52C respectively include a first input buffer size 54A, a second input buffer size 54B, and a third input buffer size 54C; a first logic function 56A, a second logic function 56B, and a third logic function 56C; and a first output buffer size 58A, a second output buffer size 58B, and a third output buffer size 58C.

Generating the inferencer graph 50 may include, for a first internal representation layer 42 and a second internal representation layer 42 of the internal representation graph 40 that both output to a third internal representation layer 42, setting the first output buffer size 58A and the second output buffer size 58B of the corresponding first inferencer layer block 52A and the second inferencer layer block 52B to be equal to each other. The first output buffer size 58A and the second output buffer size 58B may also be equal to the third input buffer size 54A. Thus, the first inferencer layer block 52A and the second inferencer layer block 52B may both have outputs that are eligible inputs to the third inferencer layer block 52C.

During the optimization phase, the processor 12 may be further configured to apply bias channel reduction, 3×3 Winograd convolution, 5×5 complex-domain Winograd convolution, or filter-sparsity packing and runtime skipping to at least one internal representation layer 42 of the plurality of internal representation layers 42. These algorithms may reduce a number of computations that are performed at the one or more processing devices 22 that implement the layer 32 of the machine learning model topology 30 corresponding to that internal representation layer 42.

Figure 5:
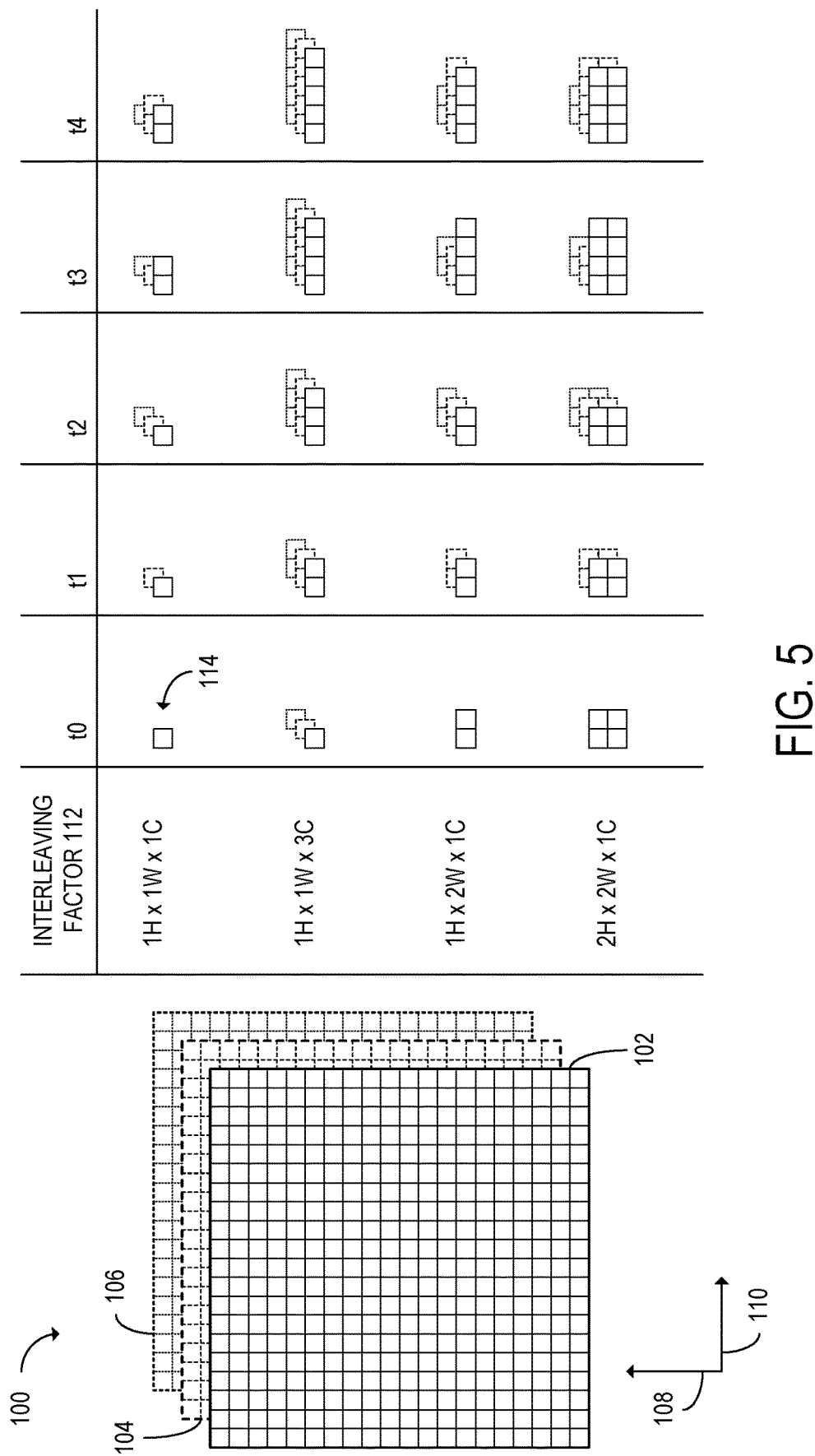
FIG. 5 shows an example multidimensional tensor and portions of the multidimensional tensor that the inferencer layer blocks may take as inputs, according to the embodiment of FIG. 1.

During the optimization phase, the processor 12 may be further configured to select an input ordering 60 for a plurality of inferencer layer inputs to at least one inferencer layer block 52 of the plurality of inferencer layer blocks 52. As shown in the example of FIG. 5, the inferencer layer inputs 114 may be portions of a multidimensional tensor 100. The multidimensional tensor 100 of FIG. 5 is an image that includes a red channel 102, a green channel 104, and a blue channel 106. In addition, the multidimensional tensor 100 has a height dimension 108 and a width dimension 110. The input ordering 60 may specify an interleaving factor 112 for the multidimensional tensor 100, which may indicate a respective size in each dimension for the inferencer layer inputs 114. The example of FIG. 5 shows four example interleaving factors 112 expressed in terms of height, width, and number of channels: 1H×1 W×1C, 1H×1 W×3C, 1H×2 W×1C, and 2H×2 W×1C. In addition, the example of FIG. 5 shows a plurality of timesteps t0, t1, t2, t3, and t4. Over the plurality of timesteps t0, t1, t2, t3, and t4, inferencer layer inputs 114 with respective sizes defined by the interleaving factor 112 may be iteratively input into an inferencer layer block 52 to load the multidimensional tensor 100.

Returning to FIG. 1, the processor 12 may be further configured to perform one or more of the device optimizations discussed below. Each device optimization is a process by which a plurality of hardware devices included in the one or more host computing devices 20 are allocated for performing the computations indicated in the plurality of internal representation layers 42. These hardware devices may include the processing devices 22, the host memory 26, and/or one or more digital signal processors (DSPs) 28, as discussed in further detail below. In some examples, performing each of the device optimizations may include minimizing a respective loss function using an SLSQP algorithm. When performing the one or more device optimizations in examples in which the machine learning model topology 30 includes a respective plurality of performance targets 34 for the plurality of layers 32, the processor 12 may be further configured to generate the inferencer graph 50 such that the plurality of inferencer layer blocks 52 meet the respective plurality of performance targets 34. Additionally or alternatively, in examples in which the machine learning model topology 30 includes a respective plurality of processing device type indicators 36 for the plurality of layers 32, the processor 12 may be configured to select the plurality of processing devices 22 such that the plurality of processing devices 22 match the plurality of processing device type indicators 36.

In some examples, the one or more hardware devices may be allocated at least in part by querying a lookup table 68. The lookup table 68 may indicate, for an input buffer size 54, a logic function 56, and an output buffer size 58 of an inferencer layer block 52, a respective estimated utilization level for each of one or more types of hardware device included in the host computing device 20. In some examples, when the lookup table 68 does not include an exact match for the input buffer size 54, the logic function 56, and the output buffer size 58 of an inferencer layer block 52, the processor 12 may be configured to estimate the device utilization level for at least one hardware device using a polynomial interpolation function. For example, the polynomial interpolation function may be a Lagrange polynomial with $n \leq 5$. In such examples, the output of the polynomial interpolation function may be added to the lookup table 68.

During the optimization phase of the compiler 46, the processor 12 may be further configured to determine a respective memory layout 61 of memory allocated to each inferencer layer block 52 of the plurality of inferencer layer blocks 52. The memory for which the memory layout 61 is determined may be the host memory 26 of the host computing device 20 in which the processing device 22 is located. The memory layout 61 may indicate one or more areas of volatile memory (which may be on-chip memory), non-volatile memory (which may be off-chip memory), and/or virtual random-access memory (RAM) allocated to the inferencer layer block 52. As discussed above, the memory layout 61 may be determined at least in part by minimizing a loss function using an SLSQP algorithm. In some examples, memory types that are more highly distributed may be assigned lower costs in the loss function, and off-chip memory may have a higher cost than on-chip memory. The loss function may, in such examples, include one or more penalty terms for completely filling one or more respective types of memory.

In some examples, the memory layout 61 may be determined at least in part by querying the lookup table 68 for the respective areas of the host memory 26 that are appropriately sized for allocation to the inferencer layer block 52. This query of the lookup table 68 may be based on the input buffer size 54 and the output buffer size 58. In addition, the memory layout 61 may be based at least in part on one or more access patterns 70 of one or more respective areas of the host memory 26. Each access pattern 70 may indicate, for an area of the host memory 26, a frequency with which that area is configured to be accessed when the machine learning model topology 30 is implemented at the plurality of processing devices 22. The access pattern 70 may be determined from the internal representation graph 40, and the amount of off-chip memory allocated to the inferencer layer block 52 may be selected as indicated in the access pattern 70.

In some examples, as shown in FIG. 1, the host computing device 20 may include one or more DSPs 28. The DSP 28 may be configured to receive a continuous-domain input and generate a digital output based on the continuous-domain input. Each continuous-domain input may, for example, be a machine learning model weight or a machine learning model activation. During the optimization phase, the processor 12 may be further configured to allocate at least one DSP 28 to perform the logic function 56 of at least one inferencer layer block 52 of the plurality of inferencer layer blocks 52. For example, the DSP 28 may be utilized to perform a multiplication operation. In some examples, the processor 12 may be configured to maximize a proportion of the logic functions 56 of the plurality of inferencer layer blocks 52 that are performed at the one or more DSPs 28 rather than at the plurality of processing devices 22. Using a DSP 28 rather than a processing device 22 to perform the logic function 56 of an inferencer layer block 52 may save time that would otherwise be spent loading cached data into the processing device 22.

Figure 6:
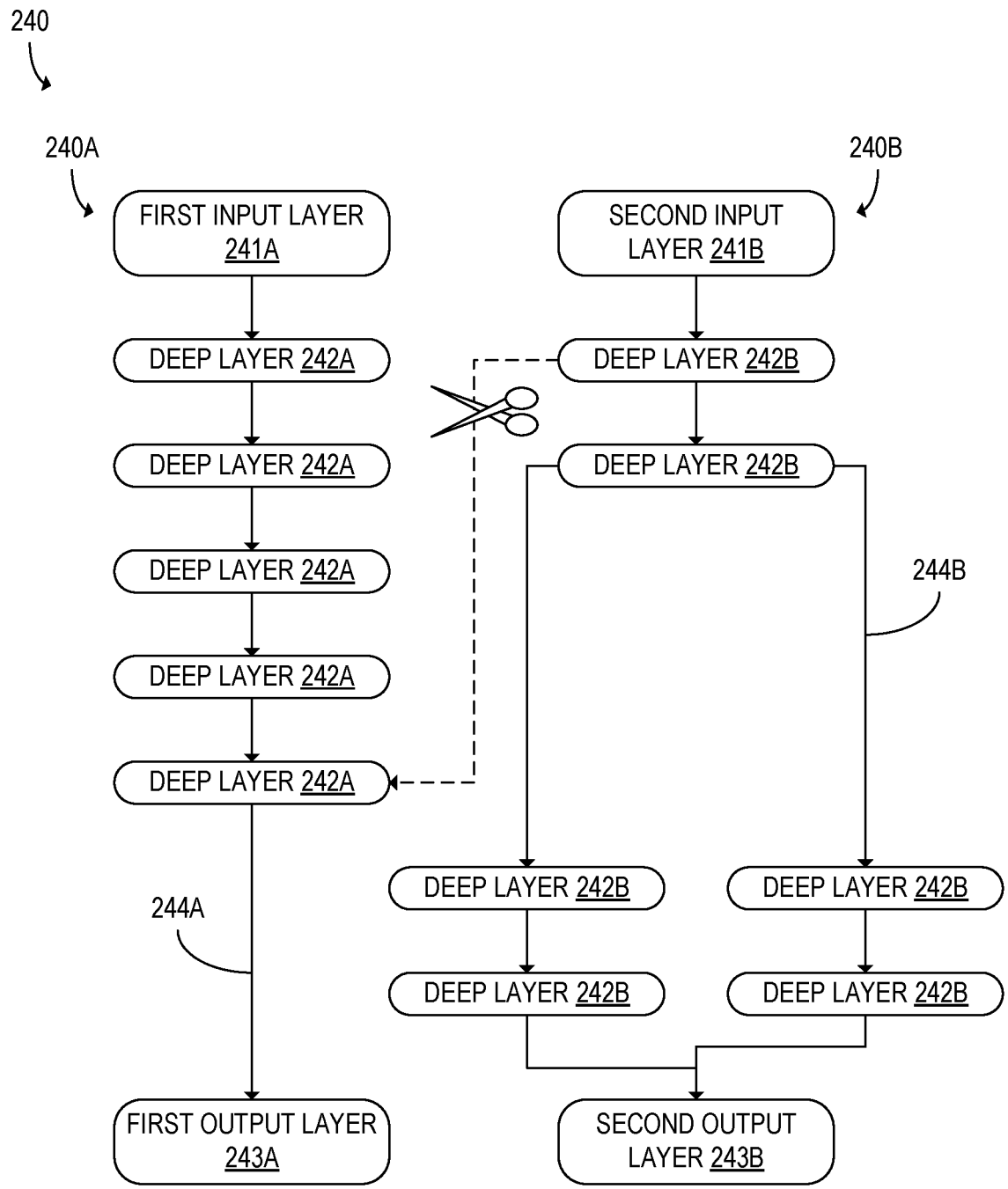
FIG. 6 shows an example internal representation graph that is divided into a first internal representation subgraph and a second internal representation subgraph, according to the embodiment of FIG. 1.

FIG. 6 shows another example of an internal representation graph 240. During the optimization phase, the processor 12 may be further configured to divide the internal representation graph 240 into at least a first internal representation subgraph 240A and a second internal representation subgraph 240B. The first internal representation subgraph 240A shown in FIG. 6 includes a first input layer 241A, a plurality of deep layers 242A, and a first output layer 243A, which are connected by a plurality of first subgraph edges 244. The second internal representation subgraph 240B includes a second input layer 241B, a plurality of deep layers 242B, and a second output layer 243B. To divide the internal representation graph 240 into the first internal representation subgraph 240A and the second internal representation subgraph 240B, the processor 12 may be configured to remove an edge from the internal representation graph 240. In some examples, the processor 12 may be configured to remove a plurality of edges from the internal representation graph. Additionally or alternatively, the processor 12 may be configured to divide the internal representation graph into more than two subgraphs in some examples.

The processor 12 may be configured to select the one or more edges to remove from the internal representation graph 240 based at least in part on a respective amounts of memory allocated to the inferencer layer blocks 52 generated from the first internal representation subgraph 240A and the second internal representation subgraph 240B. In one example, the processor 12 may be configured to minimize a loss function that increases as the difference in memory utilization between the first internal representation subgraph 240A and the second internal representation subgraph 240B increases, and that also increases as the total number of removed edges increases. In this example, the processor 12 may use a sequential least-squares quadratic programming algorithm to minimize the loss function.

FIG. 7 shows an example flowchart of a method 300 that may be performed at the processor 12 when generating an inferencer graph 50 from an internal representation graph 40. In the example of FIG. 7, the processor 12 may be configured to receive a respective plurality of processing device type indicators 36 and a respective plurality of performance targets 34 for the plurality of layers 32 of the machine learning model topology 30. At step 302, the processor 12 may be configured to receive an internal representation generated from the machine learning model topology 30. At step 304, the processor 12 may be further configured to determine whether any configuration of processing devices 22 connected to the computing system 10 satisfies the plurality of processing device type indicators 36 for the plurality of layers 32. For example, the processor 12 may be configured to query a table of device attributes for the plurality of processing devices 22.

At step 306, when the processor 12 determines that there is a configuration of processing devices 22 that matches the plurality of processing device type indicators 36, the processor 12 may be further configured to determine whether the processing devices 22 identified as matching the processing device type indicators 36 match the plurality of performance targets 34. When the identified plurality of processing devices 22 match the performance targets 34, the processor 12 may be configured to generate the inferencer graph 50 at step 308. When the identified processing devices 22 do not match the performance targets 34, the processor 12 may instead be configured to, at step 310, generate a performance-modified internal representation model. The performance-modified internal representation model may indicate a performance-modified processing device configuration that matches the plurality of processing device type indicators 36 and does not meet the plurality of performance targets 34. The processor 12 may then generate a performance-modified inferencer graph from the performance-modified internal representation at step 308.

At step 312, when the processor 12 determines that there is no configuration of the plurality of processing devices 22 communicatively coupled to the processor 12 that matches the plurality of processing device type indicators 36, the processor 12 may be further configured to generate a device-modified internal representation. The device-modified internal representation may indicate a device-modified processing device configuration that does not match the plurality of processing device type indicators 36. Instead, for one or more internal representation layers 42, the device-modified processing device configuration may include one or more respective processing devices 22 that are capable of performing the functions indicated in those internal representation layers 42 despite not have the processing device types specified in the machine learning model topology 30.

At step 314, the processor 12 may be further configured to determine whether the plurality of processing devices 22 indicated in the device-modified internal representation meet the performance targets 34. When the plurality of processing devices 22 meet the performance targets 34, the processor 12 may be further configured to generate a device-modified inferencer graph from the device modified internal representation at step 308. When the plurality of processing devices 22 indicated in the device-modified internal representation do not meet the performance targets 34, the processor 12 may be further configured to generate a performance-modified device-modified internal representation at step 316. At step 308, the processor 12 may then be configured to generate a performance-modified device-modified inferencer graph from the performance-modified device-modified internal representation.

Although, in the example of FIG. 7, the processor 12 is configured to check whether the processing devices 22 indicated in the internal representation 40 match the processing device type indicators 36 before checking whether the processing devices 22 meet the performance targets 34, the processor 12 may instead be configured to check whether the processing devices 22 meet the performance targets 34 before checking whether the processing devices 22 match the processing device type indicators 36 in other examples.

Returning to FIG. 1, after the inferencer graph 50 has been generated, the processor 12 may be further configured to, at deployment time, transmit instructions 62 to implement the machine learning model topology 30 to a plurality of processing devices 22. The instructions 62 may be instructions to implement the machine learning model topology 30 with the respective input buffer sizes 54, logic functions 56, and output buffer sizes 58 indicated in the plurality of inferencer layer blocks 52 of the inferencer graph 50. The processor 12 may be further configured to receive, from the one or more host computing devices 20, one or more outputs that are generated at the one or more host computing devices 20 as results of executing the instructions 62. The one or more outputs may include a machine learning model. Alternatively, the one or more outputs may be transmitted to some other computing device.

In examples in which the processor 12 is configured to divide the internal representation graph 240 into a first internal representation subgraph 240A and a second internal representation subgraph 240B, as shown in FIG. 6, the processor 12 may be configured to, at deployment time, transmit instructions 62 to implement the first internal representation subgraph 240A to a first subset of the plurality of processing devices 22. In addition, the processor 12 may be further configured to transmit instructions 62 to implement the second internal representation subgraph 240B to a second subset of the plurality of processing devices 22. Thus, the processor 12 may be configured to parallelize the instructions 62 generated from the first internal representation subgraph 240A and the second internal representation subgraph 240B between the first subset and the second subset. This parallelization may allow the machine learning model topology 30 to be implemented on the plurality of processing devices 22 in a shorter amount of time.

Figure 8A:
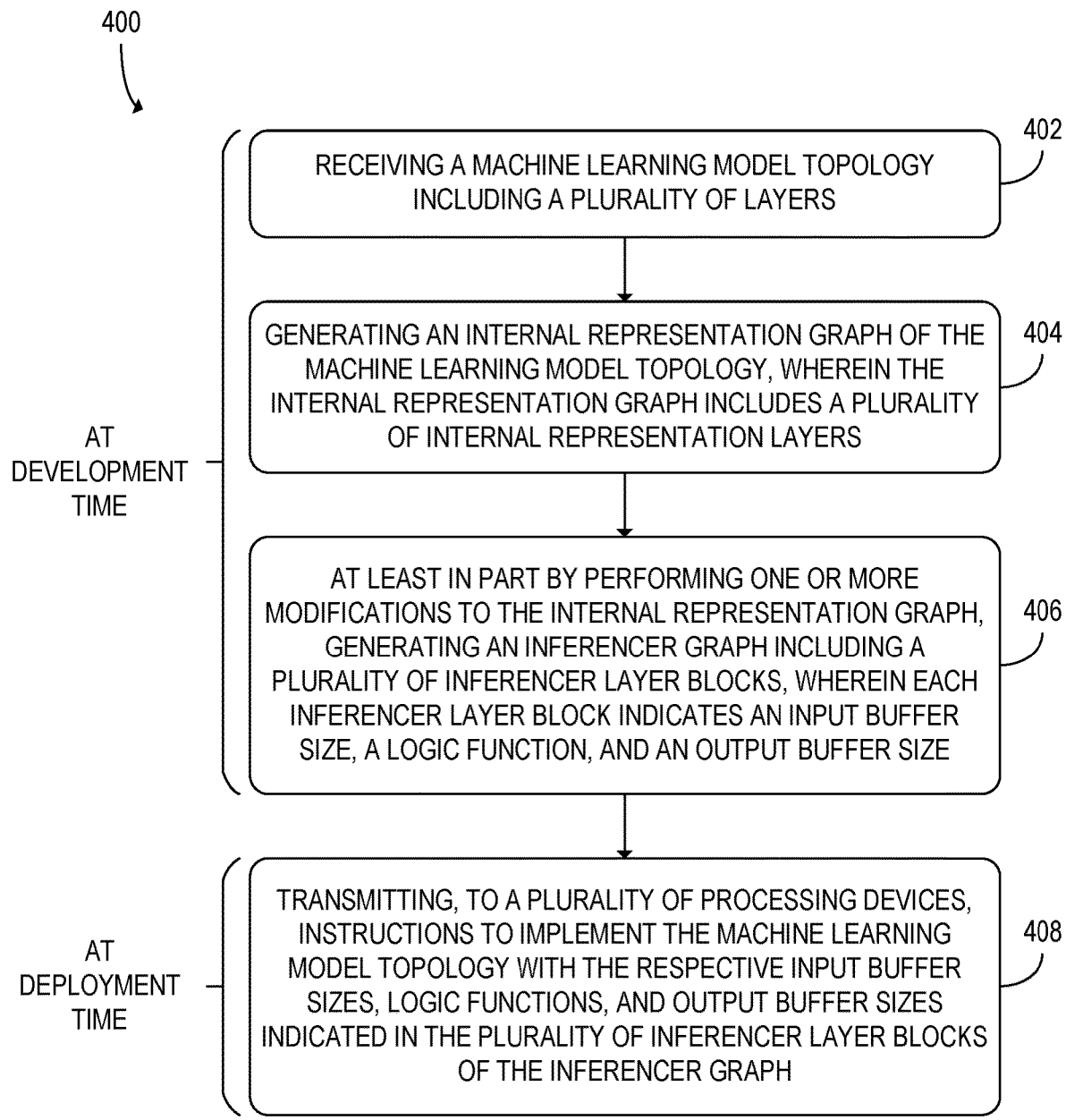
FIG. 8A shows a flowchart of an example method that may be used with a computing system to implement a machine learning model topology, according to the embodiment of FIG. 1.

FIG. 8A shows a flowchart of an example method 400 that may be used with a computing system to implement a machine learning model topology, according to one example. The computing system may be the computing system 10 of FIG. 1 or some other computing system. The method 400 may include, at step 402, receiving a machine learning model topology including a plurality of layers. Step 402 may be performed at development time at a processor of the computing device, and the machine learning model topology may be received from a program such as an SDK. The machine learning model topology may be structured as a DAG in which the layers are connected by a plurality of directed edges.

At step 404, the method 400 may further include generating an internal representation graph of the machine learning model topology. The internal representation graph may include a plurality of internal representation layers. Similarly to the machine learning model topology, the internal representation may be a DAG in which the plurality of internal representation layers are connected by a plurality of directed internal representation edges. The internal representation graph may be generated during development time at a compiler executed by the processor.

At step 406, the method 400 may further include generating an inferencer graph including a plurality of inferencer layer blocks. The inferencer graph may be generated at least in part by performing one or more modifications to the internal representation graph. The one or more modifications may be performed during development time and may include one or more algorithmic optimizations or device optimizations performed at the compiler during an optimization phase. Each inferencer layer block may indicate an input buffer size, a logic function, and an output buffer size.

At step 408, the method 400 may further include transmitting, to a plurality of processing devices, instructions to implement the machine learning model topology. The instructions transmitted to the plurality of processing devices may be instructions to implement the machine learning model topology with the respective input buffer sizes, logic functions, and output buffer sizes indicated in the plurality of inferencer layer blocks of the inferencer graph. Step 408 may be performed at deployment time. The plurality of processing devices may be located in one or more host computing devices, which may each be connected to the processor by a respective wired connection.

Thus, the machine learning model topology may be translated first into the internal representation, then into the inferencer graph, and then into the instructions, which may be executed on the plurality of processing devices.

Figure 8B:
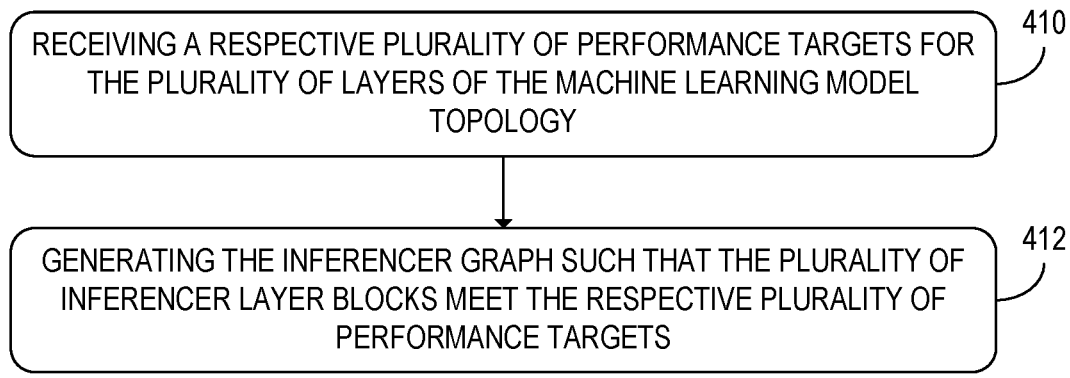

FIGS. 8B-8E show additional steps of the method 400 that may be performed in some examples. As shown in FIG. 8B, the method 400 may further include, at step 410, receiving a respective plurality of performance targets for the plurality of layers of the machine learning model topology. The plurality of performance targets may be received with the machine learning model topology during development time. For example, when the machine learning model topology is received from an SDK, the user of the SDK may further specify the performance targets for the layers. For example, the performance target for a layer may be a maximum latency or a minimum throughput for the computations performed at that layer. At step 412, the method 400 may further include generating the inferencer graph such that the plurality of inferencer layer blocks meet the respective plurality of performance targets. Step 412 may be performed during the optimization phase performed at the compiler. Generating the inferencer graph such that the plurality of inferencer layer blocks meet the plurality of performance targets may, for example, include generating a device-modified inferencer graph indicating a device-modified processing device configuration that meets the plurality of performance targets and does not match a plurality of processing device type indicators.

Figure 8C:
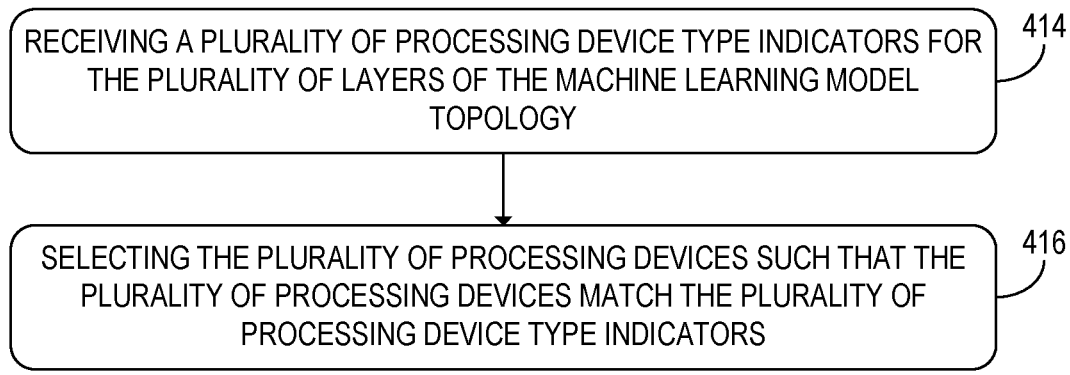

As shown in FIG. 8C, the method 400 may further include, at step 414, receiving a plurality of processing device type indicators for the plurality of layers of the machine learning model topology. The plurality of processing device type indicators may be received with the machine learning model topology during development time. For example, when the machine learning model topology is received from an SDK, the user of the SDK may further specify the processing device types with which the functions performed at the layers are configured to be executed. At step 416, the method 400 may further include selecting the plurality of processing devices such that the plurality of processing devices match the plurality of processing device type indicators. For example, selecting the plurality of processing devices such that the processing devices match the processing device indicators may include generating a performance-modified inferencer graph indicating a performance-modified processing device configuration that matches the plurality of processing device type indicators and does not meet the plurality of performance targets.

FIG. 8D shows additional steps of the method 400 that may be performed when the internal representation graph is modified to obtain the inferencer graph at step 406. At step 418, the method 400 may further include, for a first internal representation layer and a second internal representation layer of the internal representation graph that both output to a third internal representation layer, setting the output buffer sizes of the corresponding inferencer layer blocks to be equal to each other. For example, the output buffer size of the first internal representation layer may be set to be equal to the output buffer size of the second internal representation layer when the machine learning model topology includes mixed-precision computations. In such examples, the plurality of layers included in the machine learning model topology have two or more respective computation precisions. Performing step 418 may allow the inputs and outputs of layers with computation different precisions to be made compatible with each other.

At step 420, the method 400 may further include applying bias channel reduction, 3×3 Winograd convolution, 5×5 complex-domain Winograd convolution, or filter-sparsity packing and runtime skipping to at least one internal representation layer of the plurality of internal representation layers. These algorithms may allow for savings in the number of computations performed at the one or more processing devices.

At step 422, the method 400 may further include selecting an input ordering for a plurality of inferencer layer inputs to at least one inferencer layer block of the plurality of inferencer layer blocks. For example, when the inputs to an inferencer layer are portions of multidimensional tensors, the input ordering may indicate a size in each dimension for those portions.

At step 424, the method 400 may further include determining a respective memory layout of memory allocated to each inferencer layer block of the plurality of inferencer layer blocks. The memory layout for an inferencer layer block may be an allocation of a portion of the host memory of a host computing device. The memory layout may indicate one or more areas of on-chip memory, off-chip memory, or virtual RAM that are allocated to the inferencer layer block. In some examples, the memory layout for an inferencer layer block may be determined based on an estimated memory usage pattern for that inferencer layer block.

At step 426, the method 400 may further include allocating at least one DSP to perform the logic function of at least one inferencer layer block of the plurality of inferencer layer blocks. The DSP may be configured to receive a continuous-domain input and produce a digital output. The DSP may, for example, be configured to perform a multiplication operation. In some examples, the at least one DSP may be allocated such that the number of logic functions configured to be performed at the plurality of processing devices instead of at the at least one DSP is minimized.

Figure 8E:
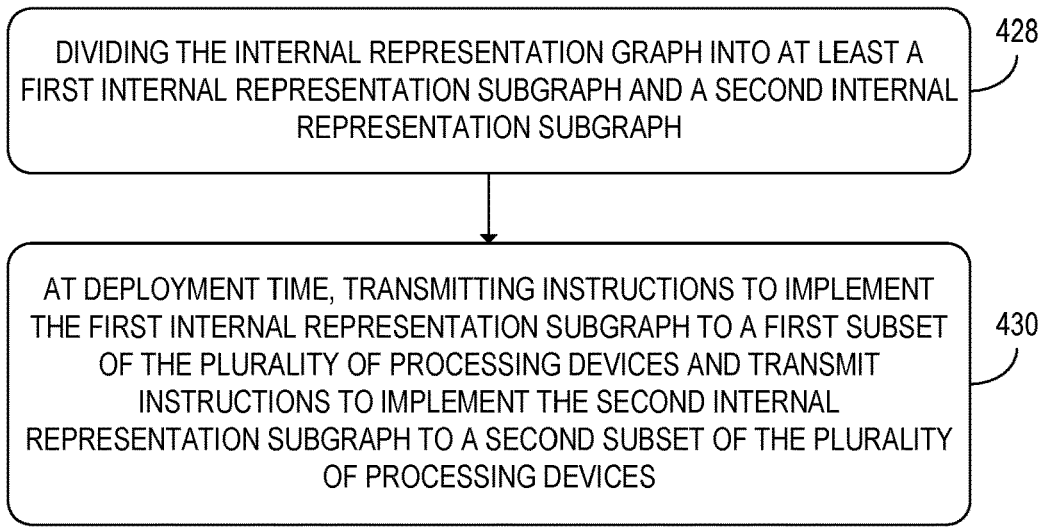

FIG. 8E also shows steps that may be performed when the inferencer graph is generated from the internal representation graph. At step 428, the method 400 may further include dividing the internal representation graph into at least a first internal representation subgraph and a second internal representation subgraph. Dividing the internal representation graph may include removing one or more internal representation edges from the internal representation graph. At step 430, the method 400 may further include, at deployment time, transmitting instructions to implement the first internal representation subgraph to a first subset of the plurality of processing devices. In addition, step 430 may further include transmitting instructions to implement the second internal representation subgraph to a second subset of the plurality of processing devices. Thus, the machine learning model topology may be parallelized between the first subset of processing devices and the second subset of processing devices. The internal representation graph may be divided into more than two internal representation subgraphs in some examples. In such examples, the instructions may be transmitted to more than two subsets of the plurality of processing devices.

Using the systems and methods discussed above, machine learning model topologies that differ significantly from commonly used topologies may be implemented using specialized hardware devices. In addition, the systems and methods discussed above allow for the computation at development time and evaluation at runtime of machine learning models that use mixed-precision computation. The above systems and methods thereby allow machine learning models with a wide variety of different architectures to be quickly and efficiently computed.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
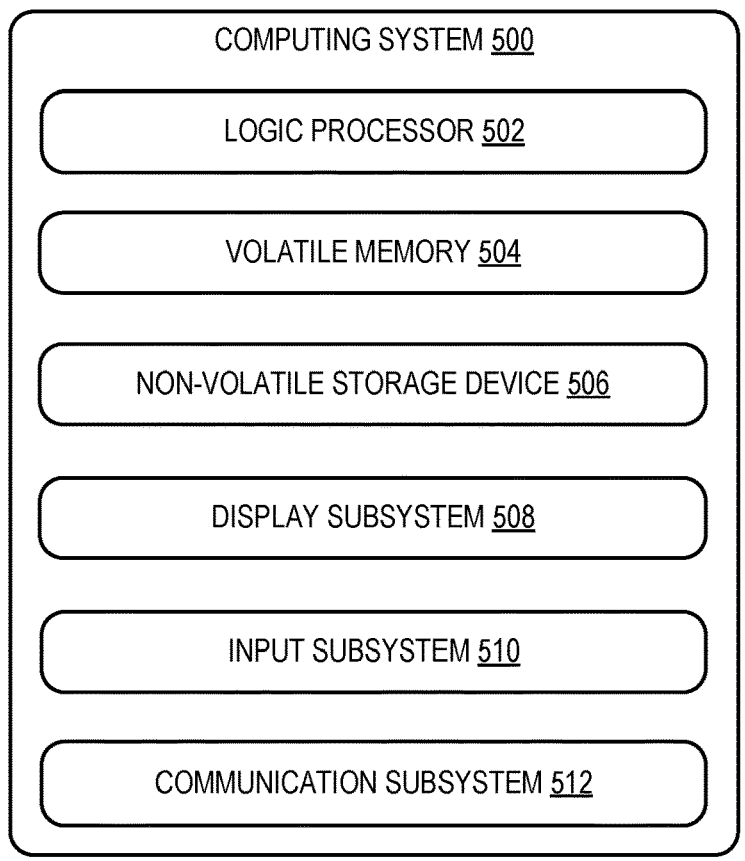
FIG. 9 shows a schematic view of an example computing environment in which the computing system of FIG. 1 may be enacted.

FIG. 9 schematically shows a non-limiting embodiment of a computing system 500 that can enact one or more of the methods and processes described above. Computing system 500 is shown in simplified form. Computing system 500 may embody the computing system 10 described above and illustrated in FIG. 1. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 9.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built-in. Non-volatile storage device 506 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs describe several aspects of the present disclosure. According to one aspect of the present disclosure, a computing system is provided, including a processor configured to, at development time, receive a machine learning model topology including a plurality of layers. The processor may be further configured to generate an internal representation graph of the machine learning model topology. The internal representation graph may include a plurality of internal representation layers. At least in part by performing one or more modifications to the internal representation graph, the processor may be further configured to generate an inferencer graph including a plurality of inferencer layer blocks. Each inferencer layer block may indicate an input buffer size, a logic function, and an output buffer size. At deployment time, the processor may be further configured to transmit, to a plurality of processing devices, instructions to implement the machine learning model topology with the respective input buffer sizes, logic functions, and output buffer sizes indicated in the plurality of inferencer layer blocks of the inferencer graph.

According to this aspect, at development time, the processor may be further configured to receive a respective plurality of performance targets for the plurality of layers of the machine learning model topology. The processor may be further configured to generate the inferencer graph such that the plurality of inferencer layer blocks meet the respective plurality of performance targets.

According to this aspect, the processor is further configured to, at development time, receive a plurality of processing device type indicators for the plurality of layers of the machine learning model topology. The processor may be further configured to select the plurality of processing devices such that the plurality of processing devices match the plurality of processing device type indicators.

According to this aspect, the processor may be further configured to receive a respective plurality of performance targets for the plurality of layers of the machine learning model topology. The processor may be further configured to determine that no available configuration of processing devices communicatively coupled to the computing system both matches the plurality of processing device type indicators and meets the plurality of performance targets. The processor may be further configured to generate a performance-modified inferencer graph indicating a performance-modified processing device configuration that matches the plurality of processing device type indicators and does not meet the plurality of performance targets, or a device-modified inferencer graph indicating a device-modified processing device configuration that meets the plurality of performance targets and does not match the plurality of processing device type indicators.

According to this aspect, generating the inferencer graph may include, for a first internal representation layer and a second internal representation layer of the internal representation graph that both output to a third internal representation layer, setting the output buffer sizes of the corresponding inferencer layer blocks to be equal to each other.

According to this aspect, generating the inferencer graph may include applying bias channel reduction, 3×3 Winograd convolution, 5×5 complex-domain Winograd convolution, or filter-sparsity packing and runtime skipping to at least one internal representation layer of the plurality of internal representation layers.

According to this aspect, generating the inferencer graph may include selecting an input ordering for a plurality of inferencer layer inputs to at least one inferencer layer block of the plurality of inferencer layer blocks.

According to this aspect, generating the inferencer graph may include determining a respective memory layout of memory allocated to each inferencer layer block of the plurality of inferencer layer blocks.

According to this aspect, generating the inferencer graph may include allocating at least one digital signal processor (DSP) to perform the logic function of at least one inferencer layer block of the plurality of inferencer layer blocks.

According to this aspect, the plurality of layers included in the machine learning model topology may have two or more respective computation precisions.

According to this aspect, generating the inferencer graph may include dividing the internal representation graph into at least a first internal representation subgraph and a second internal representation subgraph. At deployment time, the processor may be configured to transmit instructions to implement the first internal representation subgraph to a first subset of the plurality of processing devices and transmit instructions to implement the second internal representation subgraph to a second subset of the plurality of processing devices.

According to this aspect, the processor and the plurality of processing devices may be located in a data center and connected by wired connections.

According to this aspect, each processing device of the plurality of processing devices may be a central processing unit (CPU), a graphical processing unit (GPU), an application-specific integrated circuit (ASIC), or a field-programmable gate array (FPGA).

According to another aspect of the present disclosure, a method for use with a computing system is provided. The method may include, at development time, receiving a machine learning model topology including a plurality of layers. The method may further include generating an internal representation graph of the machine learning model topology, wherein the internal representation graph includes a plurality of internal representation layers. The method may further include, at least in part by performing one or more modifications to the internal representation graph, generating an inferencer graph including a plurality of inferencer layer blocks. Each inferencer layer block may indicate an input buffer size, a logic function, and an output buffer size. At deployment time, the method may further include transmitting, to a plurality of processing devices, instructions to implement the machine learning model topology with the respective input buffer sizes, logic functions, and output buffer sizes indicated in the plurality of inferencer layer blocks of the inferencer graph.

According to this aspect, the method may further include, at development time, receiving a respective plurality of performance targets for the plurality of layers of the machine learning model topology. The method may further include generating the inferencer graph such that the plurality of inferencer layer blocks meet the respective plurality of performance targets.

According to this aspect, the method may further include, at development time, receiving a plurality of processing device type indicators for the plurality of layers of the machine learning model topology. The method may further include selecting the plurality of processing devices such that the plurality of processing devices match the plurality of processing device type indicators.

According to this aspect, generating the inferencer graph may include, for a first internal representation layer and a second internal representation layer of the internal representation graph that both output to a third internal representation layer, setting the output buffer sizes of the corresponding inferencer layer blocks to be equal to each other.

According to this aspect, generating the inferencer graph may include selecting an input ordering for a plurality of inferencer layer inputs to at least one inferencer layer block of the plurality of inferencer layer blocks.

According to this aspect, generating the inferencer graph may include determining a respective memory layout of memory allocated to each inferencer layer block of the plurality of inferencer layer blocks.

According to another aspect of the present disclosure, a computing system is provided, including a processor configured to, at development time, receive a machine learning model topology including a plurality of layers. The processor may be further configured to receive a respective plurality of performance targets for the plurality of layers of the machine learning model topology. The processor may be further configured to receive a plurality of processing device type indicators for the plurality of layers of the machine learning model topology. Based at least in part on the machine learning model topology, the plurality of performance targets, and the plurality of processing device indicators, the processor may be further configured to generate an inferencer graph including a plurality of inferencer layer blocks. Each inferencer layer block may indicate an input buffer size, a logic function, and an output buffer size. At deployment time, the processor may be further configured to transmit, to a plurality of processing devices that match the plurality of processing device type indicators, instructions to implement the machine learning model topology with the respective input buffer sizes, logic functions, and output buffer sizes indicated in the plurality of inferencer layer blocks of the inferencer graph. Each inferencer layer block of the inferencer graph may meet the performance target for the corresponding layer of the machine learning model topology.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a processor configured to:
at development time:
receive a machine learning model topology including a plurality of layers; and
generate an internal representation graph of the machine learning model topology, wherein the internal representation graph includes a plurality of internal representation layers; and
at least in part by performing one or more modifications to the internal representation graph, generate an inferencer graph including a plurality of inferencer layer blocks, wherein each inferencer layer block indicates an input buffer size, a logic function, and an output buffer size; and
at deployment time, transmit, to a plurality of processing devices, instructions to implement the machine learning model topology with the respective input buffer sizes, logic functions, and output buffer sizes indicated in the plurality of inferencer layer blocks of the inferencer graph.

2. The computing system of claim 1, wherein, at development time, the processor is further configured to:
receive a respective plurality of performance targets for the plurality of layers of the machine learning model topology; and
generate the inferencer graph such that the plurality of inferencer layer blocks meet the respective plurality of performance targets.

3. The computing system of claim 1, wherein the processor is further configured to, at development time:
receive a plurality of processing device type indicators for the plurality of layers of the machine learning model topology; and
select the plurality of processing devices such that the plurality of processing devices match the plurality of processing device type indicators.

4. The computing system of claim 3, wherein the processor is further configured to:
receive a respective plurality of performance targets for the plurality of layers of the machine learning model topology;
determine that no available configuration of processing devices communicatively coupled to the computing system both matches the plurality of processing device type indicators and meets the plurality of performance targets; and
generate:
a performance-modified inferencer graph indicating a performance-modified processing device configuration that matches the plurality of processing device type indicators and does not meet the plurality of performance targets; or
a device-modified inferencer graph indicating a device-modified processing device configuration that meets the plurality of performance targets and does not match the plurality of processing device type indicators.

5. The computing system of claim 1, wherein generating the inferencer graph includes, for a first internal representation layer and a second internal representation layer of the internal representation graph that both output to a third internal representation layer, setting the output buffer sizes of the corresponding inferencer layer blocks to be equal to each other.

6. The computing system of claim 1, wherein generating the inferencer graph includes applying bias channel reduction, 3×3 Winograd convolution, 5×5 complex-domain Winograd convolution, or filter-sparsity packing and runtime skipping to at least one internal representation layer of the plurality of internal representation layers.

7. The computing system of claim 1, wherein generating the inferencer graph includes selecting an input ordering for a plurality of inferencer layer inputs to at least one inferencer layer block of the plurality of inferencer layer blocks.

8. The computing system of claim 1, wherein generating the inferencer graph includes determining a respective memory layout of memory allocated to each inferencer layer block of the plurality of inferencer layer blocks.

9. The computing system of claim 1, wherein generating the inferencer graph includes allocating at least one digital signal processor (DSP) to perform the logic function of at least one inferencer layer block of the plurality of inferencer layer blocks.

10. The computing system of claim 1, wherein the plurality of layers included in the machine learning model topology have two or more respective computation precisions.

11. The computing system of claim 1, wherein:
generating the inferencer graph includes dividing the internal representation graph into at least a first internal representation subgraph and a second internal representation subgraph; and
at deployment time, the processor is configured to transmit instructions to implement the first internal representation subgraph to a first subset of the plurality of processing devices and transmit instructions to implement the second internal representation subgraph to a second subset of the plurality of processing devices.

12. The computing system of claim 1, wherein the processor and the plurality of processing devices are located in a data center and connected by wired connections.

13. The computing system of claim 1, wherein each processing device of the plurality of processing devices is a central processing unit (CPU), a graphical processing unit (GPU), an application-specific integrated circuit (ASIC), or a field-programmable gate array (FPGA).

14. A method for use with a computing system, the method comprising:
at development time:

receiving a machine learning model topology including a plurality of layers; and generating an internal representation graph of the machine learning model topology, wherein the internal representation graph includes a plurality of internal representation layers; and at least in part by performing one or more modifications to the internal representation graph, generating an inferencer graph including a plurality of inferencer layer blocks, wherein each inferencer layer block indicates an input buffer size, a logic function, and an output buffer size; and at deployment time, transmitting, to a plurality of processing devices, instructions to implement the machine learning model topology with the respective input buffer sizes, logic functions, and output buffer sizes indicated in the plurality of inferencer layer blocks of the inferencer graph.

15. The method of claim 14, further comprising, at development time:

receiving a respective plurality of performance targets for the plurality of layers of the machine learning model topology; and generating the inferencer graph such that the plurality of inferencer layer blocks meet the respective plurality of performance targets.

16. The method of claim 14, further comprising, at development time:

receiving a plurality of processing device type indicators for the plurality of layers of the machine learning model topology; and selecting the plurality of processing devices such that the plurality of processing devices match the plurality of processing device type indicators.

17. The method of claim 14, wherein generating the inferencer graph includes, for a first internal representation layer and a second internal representation layer of the internal representation graph that both output to a third internal representation layer, setting the output buffer sizes of the corresponding inferencer layer blocks to be equal to each other.

18. The method of claim 14, wherein generating the inferencer graph includes selecting an input ordering for a plurality of inferencer layer inputs to at least one inferencer layer block of the plurality of inferencer layer blocks.

19. The method of claim 14, wherein generating the inferencer graph includes determining a respective memory layout of memory allocated to each inferencer layer block of the plurality of inferencer layer blocks.

20. A computing system comprising:

a processor configured to:

at development time:

receive a machine learning model topology including a plurality of layers;

receive a respective plurality of performance targets for the plurality of layers of the machine learning model topology;

receive a plurality of processing device type indicators for the plurality of layers of the machine learning model topology; and based at least in part on the machine learning model topology, the plurality of performance targets, and the plurality of processing device indicators, generate an inferencer graph including a plurality of inferencer layer blocks, wherein each inferencer layer block indicates an input buffer size, a logic function, and an output buffer size; and at deployment time, transmit, to a plurality of processing devices that match the plurality of processing device type indicators, instructions to implement the machine learning model topology with the respective input buffer sizes, logic functions, and output buffer sizes indicated in the plurality of inferencer layer blocks of the inferencer graph, wherein each inferencer layer block of the inferencer graph meets the performance target for the corresponding layer of the machine learning model topology.

* * * * *